(12) United States Patent
Pawsey (10) Patent No.: US 7,895,774 B2
(45) Date of Patent: Mar. 1, 2011

(54) SHOE TAGS

(76) Inventor: Christopher William Pawsey, Surrey (CA)

( * ) Notice: Subject to any disclaimer, the term of this patent is extended or adjusted under 35 U.S.C. 154(b) by 993 days.

(21) Appl. No.: 11/731,109

(22) Filed: Mar. 30, 2007

(65) Prior Publication Data

US 2007/0245598 A1    Oct. 25, 2007

(30) Foreign Application Priority Data

Mar. 31, 2006    (CA) .................................. 2541596

(51) Int. Cl.
*A43B 23/00*    (2006.01)
(52) U.S. Cl. .......................................... 36/136; 36/112
(58) Field of Classification Search .................. 36/112, 36/136, 1
See application file for complete search history.

(56) References Cited

U.S. PATENT DOCUMENTS

| | | | | |
|---|---|---|---|---|
| 505,734 A * | 9/1893 | Umstead | .................. | 24/578.11 |
| 902,573 A * | 11/1908 | Fleck | ................................ | 36/1 |
| 3,041,743 A * | 7/1962 | Monsma | ........................... | 36/1 |
| 3,482,335 A * | 12/1969 | Ornsteen | .......................... | 36/1 |
| 4,597,198 A * | 7/1986 | Schweitzer | ................... | 36/100 |
| 4,624,060 A * | 11/1986 | Maxwell | ........................... | 36/1 |
| 4,682,389 A * | 7/1987 | Callender | ................... | 24/601.7 |
| 4,712,319 A * | 12/1987 | Goria | ........................... | 36/137 |
| 5,269,690 A * | 12/1993 | Zigon | .......................... | 434/397 |
| 5,274,933 A * | 1/1994 | Cole et al. | .................... | 36/136 |
| 5,673,501 A * | 10/1997 | Mathews | ...................... | 36/136 |
| 5,800,900 A * | 9/1998 | Mitchell | ..................... | 428/100 |
| 5,926,925 A * | 7/1999 | Hicks | .......................... | 24/303 |
| 6,003,212 A * | 12/1999 | Imahata | ..................... | 24/581.1 |
| 6,092,241 A * | 7/2000 | Bellet | ............................ | 2/239 |
| 6,182,382 B1 * | 2/2001 | Skinner | ........................ | 36/136 |
| 6,412,151 B1 * | 7/2002 | Rowland | ................... | 24/598.4 |
| 7,246,455 B2 * | 7/2007 | Covington | .................... | 36/136 |
| 2005/0016028 A1 * | 1/2005 | Safdeye | ........................ | 36/132 |
| 2005/0150137 A1 * | 7/2005 | Steidle | ......................... | 36/136 |
| 2006/0260153 A1 * | 11/2006 | White | .......................... | 36/136 |

* cited by examiner

*Primary Examiner*—Marie Patterson
(74) *Attorney, Agent, or Firm*—Laurence C. Bonar (57) ABSTRACT

The present invention relates to a shoe tag comprising two parts. At least one part of the tag attaches with a left shoe and at least one part attaches with a right shoe. The left and the right part releasably link to one and other when the shoes are correctly oriented. The shoe tag assists individuals to correctly match a left shoe with his or her left foot and a right shoe with his or her right foot. The attachment may be releasable, lockable, and flexible, rigid or semi-rigid. Audible and visual signals may be emitted to indicate correct orientation.

22 Claims, 7 Drawing Sheets

SHOE TAGS

FIELD OF THE INVENTION

This invention relates to shoe tags and, in particular to shoe tags that enable the user to correctly orient the left and the right shoes.

BACKGROUND OF THE INVENTION

Correctly identifying the left and right shoes is a task that many children and some adults find difficult. Individuals that have difficulty or are unable to distinguish between left and right can be frustrated and demoralized by their lack of success and suffer diminished self-esteem because of their reliance on someone else to perform the task. Furthermore, the necessity of putting on shoes can cause frustration for caregivers and parents especially when dealing with an independent minded person who finds such aid objectionable.

Attempts have been made to aid persons in correctly orientating their shoes. For example, U.S. Pat. Nos. 5,586,888; 5,240,418; 4,823,606; 3,258,858; WO94/05176; GB2,167,592; GB2,305,766 and GB2,392,294 all disclose various methods of indicating handedness using pictorial representations that are applied directly to the shoes. U.S. Pat. Nos. 5,269,690; 3,041,743; and JP App. No. 08292808 describe the use of magnets to aid the user in correctly positioning shoes. Other methods are described in U.S. Pat. Nos. 6,746,249; 5,529,499; and 3,906,642.

SUMMARY OF THE INVENTION

The present invention relates to a shoe tag comprising two parts. At least one part of the tag attaches with a left shoe and at least one part attaches with a right shoe. The attachment may be flexible, rigid or semi-rigid. The left and right parts comprise linking means such that the parts releasably link to one and other when the shoes are correctly oriented forming the whole tag. The tag of the present invention provides a visual cue as to when the shoes are correctly oriented thereby encouraging the individual to attempt to find the correct orientation.

In one aspect of the present invention the left and the right parts comprise at least one magnet. A preferred embodiment of this aspect involves a tag comprising at least two parts each part having at least one rare earth magnet.

In a further aspect of the present invention the shoe tag comprises a graphic. Preferably the graphic is in two parts such that when the tag links together the graphic is completed. As used herein, a graphic includes any type of picture, word, logo, device, or other visual image suitable for application to a shoe tag.

In a further aspect of the present invention the shoe tag gives an audible signal when the two parts link together in the correct orientation.

In a further aspect of the present invention the shoe tag gives a visual signal such as a flashing light when the two parts link together in the correct orientation.

As used herein, "a" or "an" means "at least one" or "one or more".

It will be understood that there are a variety of closure mechanisms for footwear such as laces or Velcro™ bands or a strap with buckles. Reference to 'laces' in this text is not intended to limit the invention to use with shoes having laces. Unless otherwise specified, the present tags may be attached to any suitable type of shoe.

Unless defined otherwise, all technical and scientific terms used herein have the same meaning as is commonly understood by one of ordinary skill in the art to which this invention belongs. Unless otherwise specified, all patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference.

DETAILED DESCRIPTION OF THE INVENTION

The present invention relates to a shoe tag comprising a left and a right part. The left part of the tag flexibly attaches with a left shoe and the right part of the tag flexibly attaches with a right shoe. The left and the right part releasably link to one and other when the shoes are correctly oriented.

The tag should be of a size and weight such that it can be attached to a pair of shoes without being cumbersome. Preferably the tag should weigh less than about 100 g, more preferably less than about 50 g. Preferably the diameter of the tag is less than about 100 mm, more preferably less than about 80 mm, even more preferably less than about 60 mm. These measurements refer to the tag when the two parts are linked together but does not include the shoe attachment means. The tag can be of any suitable shape. Preferred are shapes which are pleasing to the eye. Preferred are shapes with a line of symmetry. Preferably the left part and the right part are mirror images in terms of shape. Preferred shapes include circles, ovals, cruciform, flower-shapes, squares, rectangles, stars, spheres, and the like. More preferred are circles, ovals, and cruciform.

The tag may be made out of any suitable material. Preferred materials include plastics, fabrics, leather, metals, and combinations thereof. Optionally wood may be used. Optimally the tag is made out of plastic,. Preferred plastics for use herein include, but are not limited to, acrylonitrile-butadiene-styene copolymer (ABS), polystyrenes, polyethylenes, polypropylenes, polyvinyl chloride, acrylics and combinations thereof. Each part of the tag may be made from a different material but is preferably made from the same material. Each part may be a one-piece design or may comprise a body-portion and a shoe-cooperation portion.

The tag flexibly attaches with the shoe. As used in this context, "flexible" means able to move in relation to the shoe i.e. that the tag is not in a fixed position on the shoe. This flexibility enables the two parts of the tag to move relative to one and other when they are correctly oriented and, hence, link up. The attachment may be by any suitable means but it is preferred that the means allow the tag to be removed and reused. The attachment is preferably removable from both the shoe and the tag. Optionally, the attachment means may be removable from either the tag or the shoe, or may be integral to both the shoe and the tag. Preferably the attachment means is selected from elastic, leather, other fabrics, Velcro™, clips, plastics, string, cords, threads, filament, twine, snaps, and combinations thereof. The attachment means may be a separate element or may be an integral component of each part of the tag. The attachment means may also be rigid or semi-rigid. An advantage of the attachment means being semi-rigid or rigid is that the tag may have an overall dimension that is resistant to being swallowed by an infant, allowing the tag itself to be very small. The tag parts are also releaseably attached, in that they can be removed and placed on other shoes as desired.

In one preferred embodiment the attachment means takes the form of an elastic band, for example a fabric-covered elastic hair band, that is threaded through the laces of the shoe. In further preferred embodiment the attachment means takes the form of a beaded chain such as a metal or plastic chain with metal connector, a Velcro strip, a fabric strip or elastic strip such as Lycra® brand strips. Optimally the beaded chain or other attachment means can lock and ulock as selected by the user. In a further preferred embodiment the attachment means takes the form of a flexible, semi-rigid or rigid plastic band. The band can be a separate piece or integrated with each part of the tag. The band can take any suitable form such as an O or D-ring or a tube or a spring tensioned key chain ring. As with all attachment means, the O and D ring variations can be lockable, and flexible or rigid or semi-rigid, and either integral to the tag or separate. In the O and D ring variations, the O and D rings are moveable in relation to the tag, in that they slide through the tag to provide flexibility of the tag in relation to the band and the shoe. Additional mechanisms include eye and hook connectors, ball and socket connectors, male/female connectors, spigot and hole connectors, and other commercially available snap or connecting means. The attachment means may include a biasing system, whereby when the attachment means is in the closed position, the means are biased with a spring to retain it in a closed position. The attachment means may provide an audible snapping sound when correctly engaged. The band can also be made in a variety of forms such as wavy, zigzag, curly, spiral, or regular. The band may also be made in a variety of colours. One preferred material for such a band is polyurethane. The band may be integral to the tag or it may be attached by an eyelet or other commercially known means. The flexible attachment means between either the tag and the band or the band and the shoe permits the tag and band to rest on the shoe or proximate to the shoe in an unobtrusive manner, such that when the part of the tag is engaged with the corresponding other part, the tag parts may move and engage freely. The band or attachment means may be integral to the tag or may be slideably engaged with or attached to the tag such that the tag and band or attachment means are moveable in relation to each other.

The left and the right parts of the tag releasably link to one and other. This linkage may be by any suitable means. In a highly preferred embodiment the linkage is provided by magnets. The magnets are preferably enclosed within the tag. For example, when the tag is made out of plastic the magnets can be embedded within the body of the tag. The magnets should be complementary. That is, the magnetic force should attract rather than repel, and they should be adapted to link the left and the right parts of the tag together when the shoes are correctly oriented. The magnets may be of any suitable size and shape. Preferably there are at least two magnets in each part. Regular bar magnets may be used but due to their superior weight to strength ratio preferred magnets for use herein are rare earth magnets. These are magnets that comprise alloys of the Lanthanide group of elements. The two most common elements for use in rare earth magnets are Neodymium and Samarium. The most commonly available rare earth magnets, and preferred for use herein, are Neodymium-Iron-Boron and Samarium-Cobalt. Alternatively, a single magnet or a single bar magnet may be employed in one part of the tag, with a metal component in the corresponding part of the tag so that the two parts of the tag snap together. In an additional variation, the parts of the tag may be linked mechanically, such as with matching Velcro™ components. There may also be a spring or other mechanical biasing means to draw the parts of the tag together once the parts are partially retained, and/or to retain the parts together once engaged. The single magnet may be embedded or attached to the tag component as indicated with the multiple magnet embodiment.

The tag herein may comprise a graphic such as a logo, text or picture. Generally, this will be applied to a top surface of the tag. Preferably the graphic is split across the left and the right part of the tag. The graphic could give a further indication to the user when the tag is correctly positioned or could be used for conveying information. Exemplary graphics include, but are not limited to, faces, fruit, camouflage patterns, phrases such as 'well done' or 'good job', company logos and the like. In addition to the graphic the present tag may comprise other information such as personal information e.g. name, address, medical information, personal photograph or representation of a three dimensional object and the like. In general this type of private information would be applied to the back of the tag and hence not be visible to the casual viewer. The graphics or logo may also be embedded in the tag or a part thereof, or the tag or parts thereof may be molded into a logo or design, such as a distinctive corporate logo or trademark.

The tags of the present invention may comprise other audio and/or visual signals to indicate successful orientation. One preferred success indicator is an audible sound that is produced when the left and the right part of the tag link together. This may be accomplished by the inclusion of an electrical circuit in the tag that is only completed when the parts are correctly linked. A further preferred success indicator is a light such as an LED that only shines when the parts are correctly linked. The light can be a single light or a series of lights. The light or lights may flash in various patterns, including with a musical accompaniment, as a further indication of success. There may also be a mechanically created audible snap sound as the parts are correctly engaged, indicated successful orientation of the parts to the user.

The present tags may be manufactured by any suitable method. The method of manufacture will depend somewhat on the materials used. It is preferred that the parts of the tag are manufactured by making at least two pieces that are subsequently fitted together. This allows for insertion of the magnets and/or attachment means. It may be beneficial for the pieces to have registration pins that help guide the two pieces together.

In one preferred embodiment the tag is made by injection molding of plastic. A preferred injection molding process involves heating a suitable plastic resin to the appropriate melting temperature, injecting the resin into a mold by, for example, a reciprocating screw or ram injector, cooling the resin, adding appropriate magnets and shoe-cooperating means, sealing by, for example, sonic welding.

In another preferred embodiment the tag is manufactured by thermoforming of plastic. A preferred thermoforming process involves placing a sheet of warm, slightly melted plastic over a three dimensional pattern or mold. A vacuum is then used to remove the air from between the pattern, pulling the warmed plastic into the mold. The sheet then cools and stiffens into the correct shape. Four pieces are made, two for the bottom of the mold with voids for the magnets & attachment means, and two for the top pieces which may have a graphic applied to them or molded integrally to the piece. Each part comprises a top and a bottom piece that are fitted together and then sealed together by, for example, solvent welding.

In another embodiment, the tag is manufactured out of ethylene vinyl acetate foam which is die-cut into the appropriate shape. The magnet and shoe attachment means are embedded and the top and bottom faces glued or otherwise fused together.

In another embodiment, the tag is manufactured out of leather. One preferred method of manufacturing such a tag is to cut four suitably shaped blanks out of leather, stitch magnets and shoe-connecting means into two of the blanks, stitch the other two blanks onto the first two.

In another embodiment, the tag can be manufactured out of ethylene vinyl acetate foam which is die-cut into the appropriate shape. The magnets and shoe attachment means are added to the appropriate voids. The foam is then sandwiched between two leather layers that are stitched or glued together.

Figure 1:
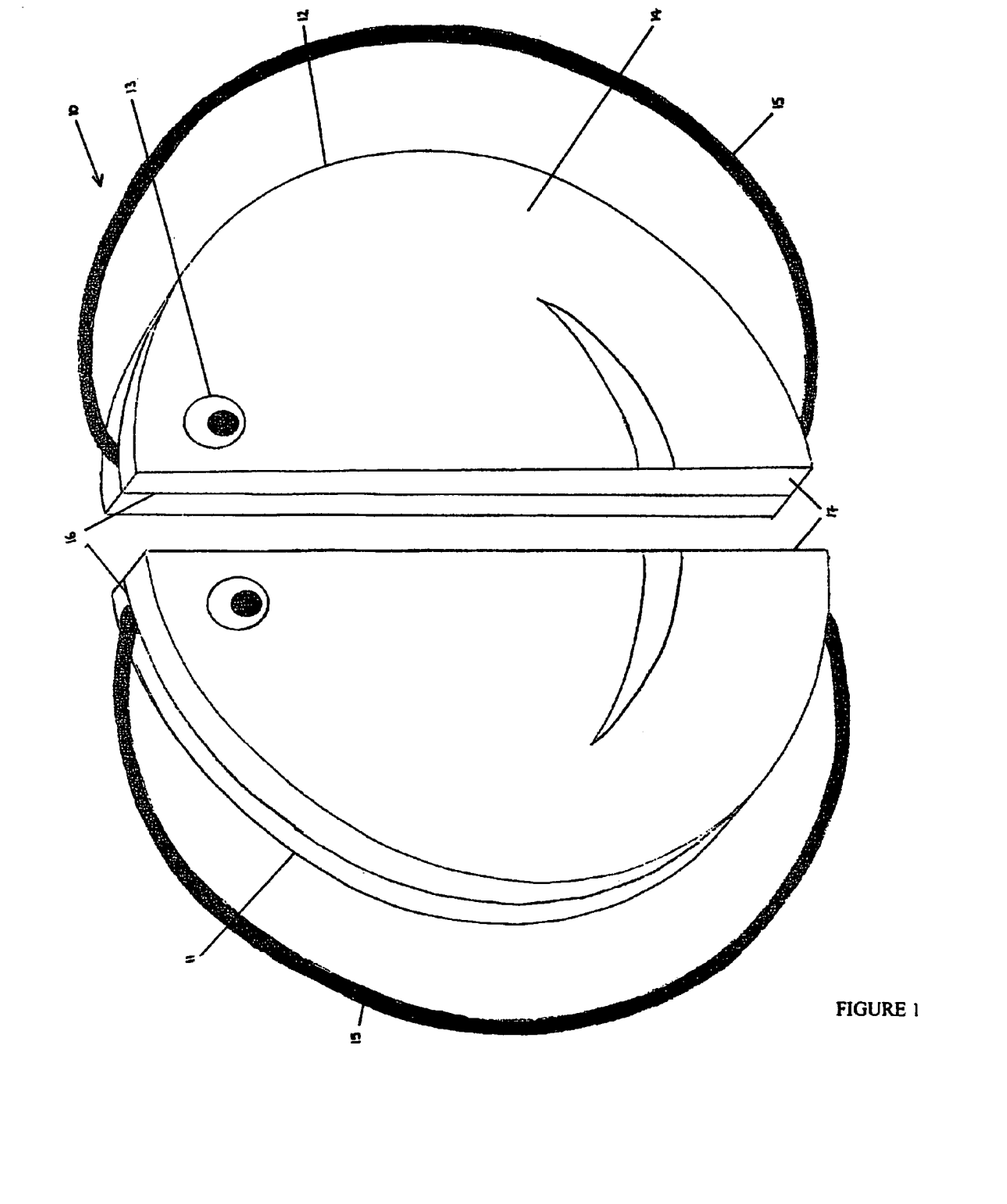
FIG. 1 shows a top perspective view of a shoe tag.

FIG. 1 shows a perspective view of the top of a shoe tag (10) according to the present invention. The tag is divided into a left part (11) and a right part (12). The tag has a graphic (13) applied to the top face (14). Each part comprises a shoe-connecting means (15) made out of fabric covered elastic. Each part is made out of two pieces of injection molded plastic that have been sonic welded together (16). Each part comprises two NdFeB magnets (not shown) positioned close to the connecting face (17).

Figure 2:
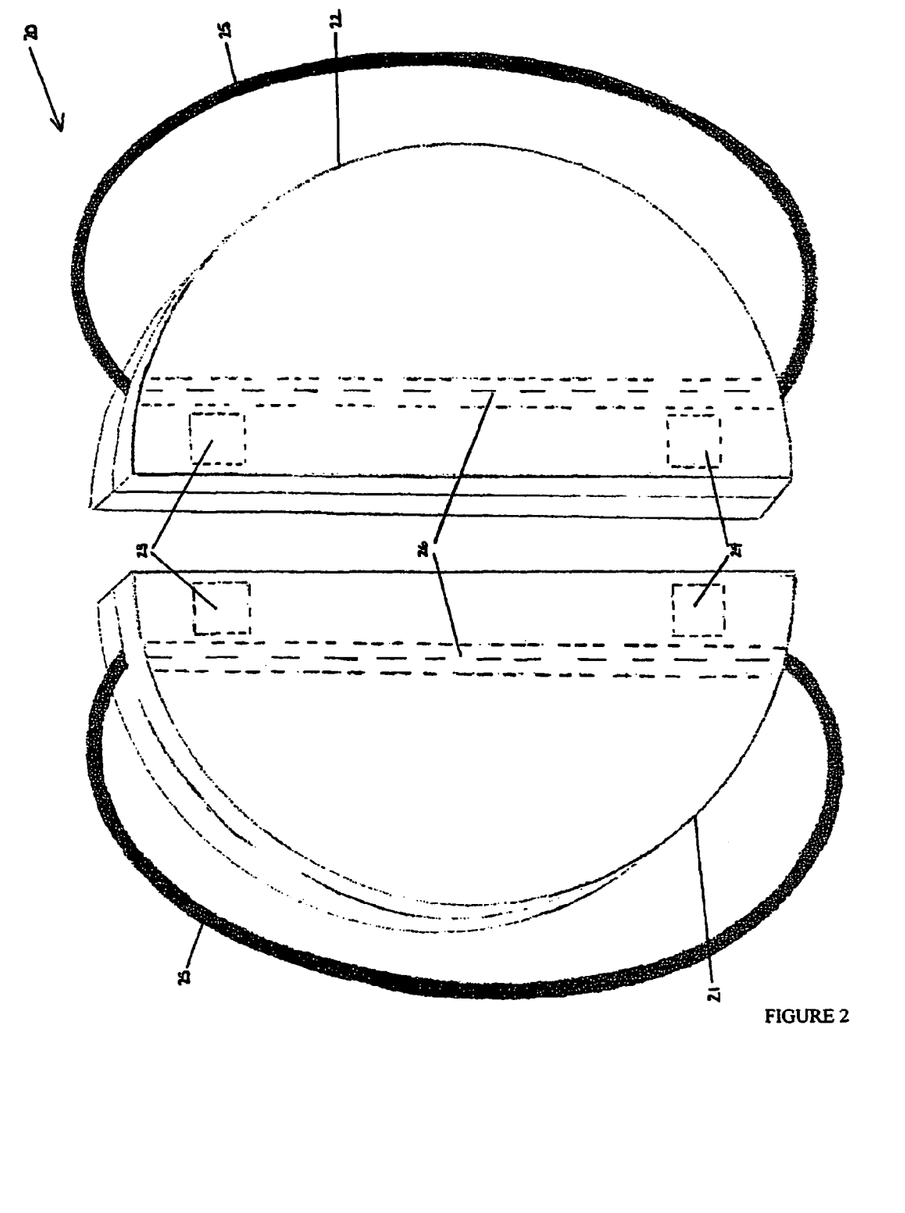
FIG. 2 shows a bottom perspective view of a shoe tag.

FIG. 2 shows a bottom perspective view of a shoe tag (20) according to the present invention. The tag is divided into a left part (21) and a right part (22). Each part comprises two NdFeB magnets (23, 24). Each part comprises a shoe-connecting means (25) made out of fabric covered elastic. Each shoe-connecting means (25) runs through a channel (26) that runs through each part (21, 22). Each part (21, 22) is made out of two pieces of injection molded plastic that have been sonic welded together.

Figure 3:
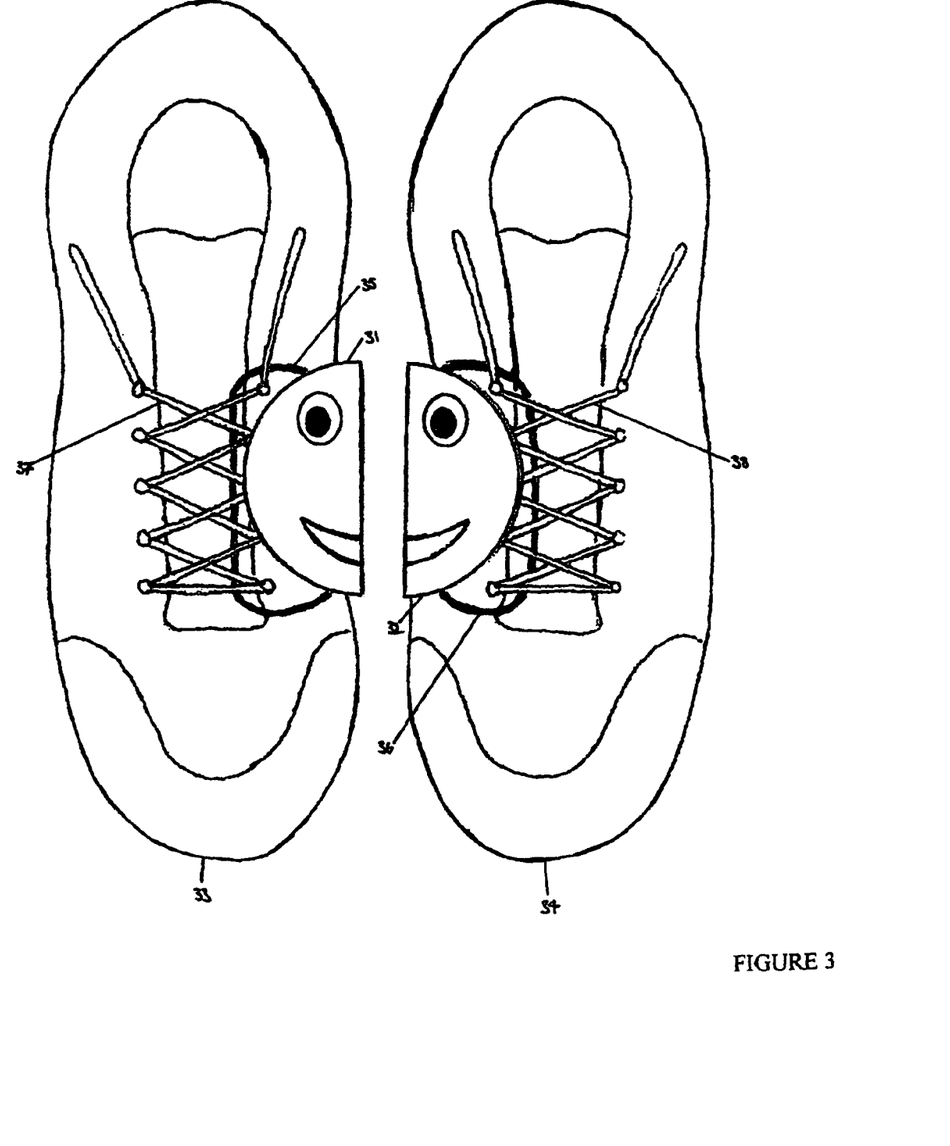
FIG. 3 shows a top perspective view of a shoe tag positioned on a pair of lace-up shoes.
Figure 4:
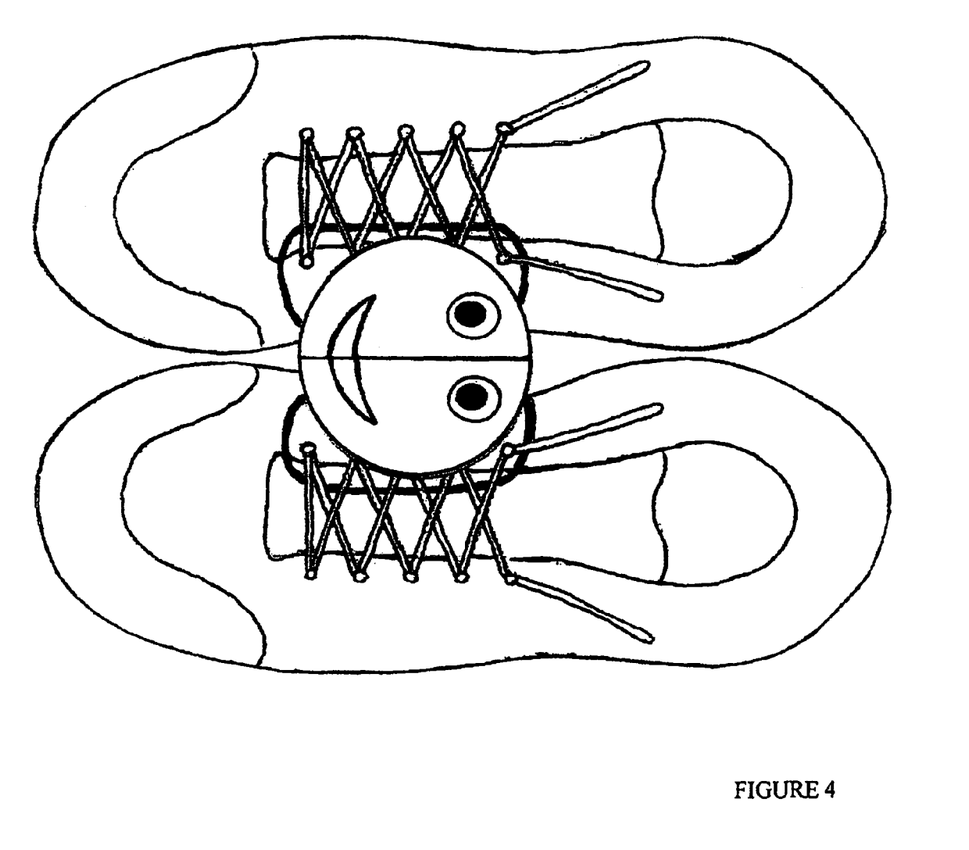
FIG. 4 shows a top perspective view of a shoe tag engaged.

FIG. 3 shows a top perspective view of a shoe tag according to the present invention positioned on a pair of lace-up shoes. The tag is divided into a left part (31) and a right part (32). The left part (31) is attached to a left shoe (33) via fabric covered elastic shoe-connecting means (35) which is woven into the laces (37). The right part (32) is attached to a right shoe (34) via fabric covered elastic shoe-connecting means (36) which is woven into the laces (38). Each part comprises two complementary NdFeB magnets that are positioned close to the connecting face such that when the shoes are correctly oriented the magnets attract one and other and the two parts link together with an audible click. FIG. 4 shows the tag in an engaged position.

Figure 5:
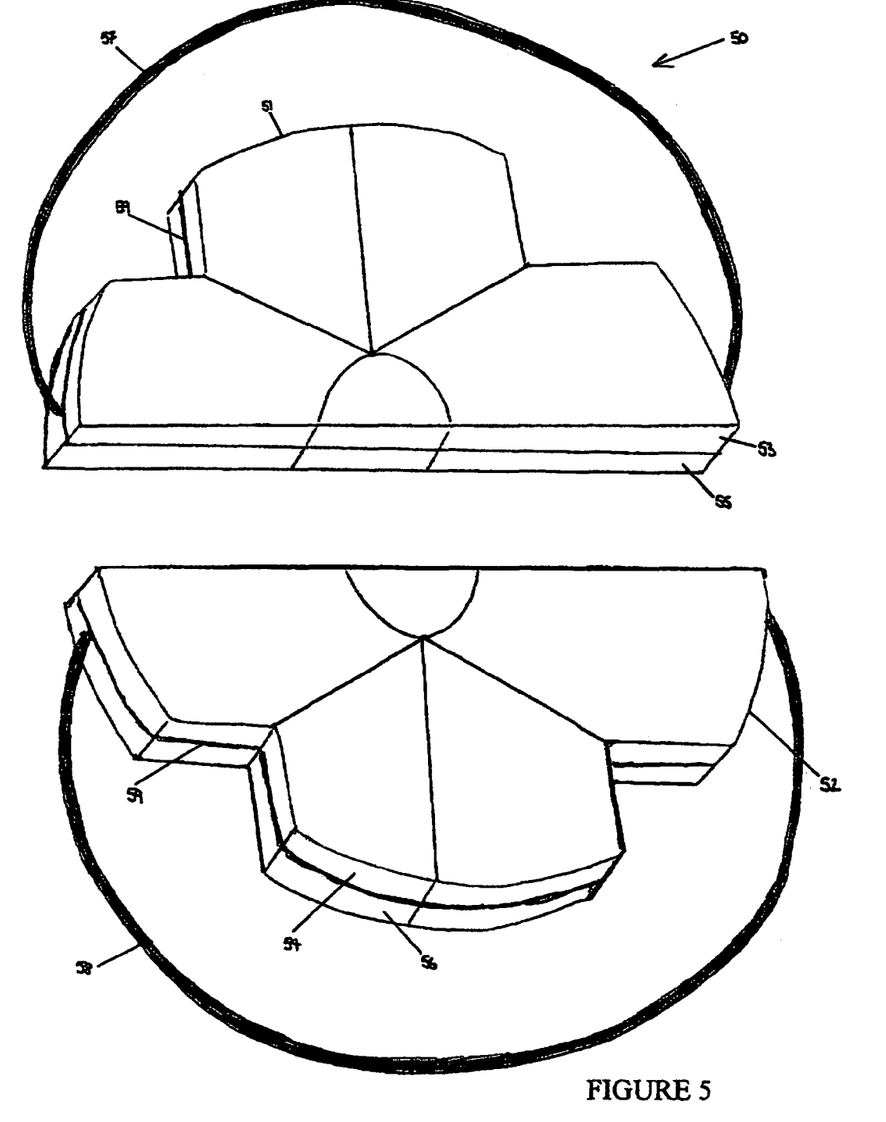
FIG. 5 shows a top perspective view of a shoe tag having a cruciform shape.

FIG. 5 shows a top perspective view of a shoe tag (50) having a cruciform shape. The tag is divided into a left part (51) and a right part (52). Each part is made by injection molding a top face (53, 54) and a bottom face (55, 56). A shoe-connecting means (57, 58) is positions in a pre-defined channel. A NdFeB magnet is positioned in each part in a complementary position. The faces are then sonic welded together along a seam (59).

Figure 6:
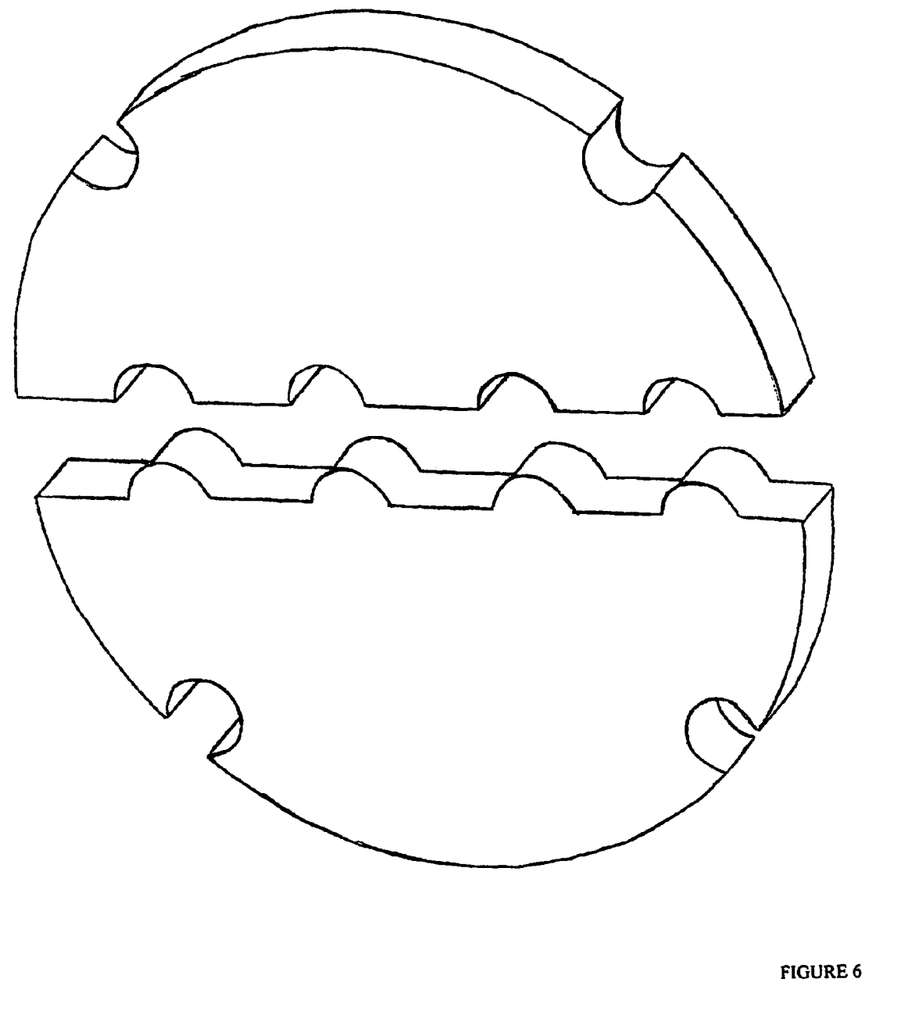
FIG. 6 shows a top perspective view of a shoe tag having an alternative shape.

FIG. 6 shows a top perspective view of a shoe tag having an alternative shape.

Figure 7:
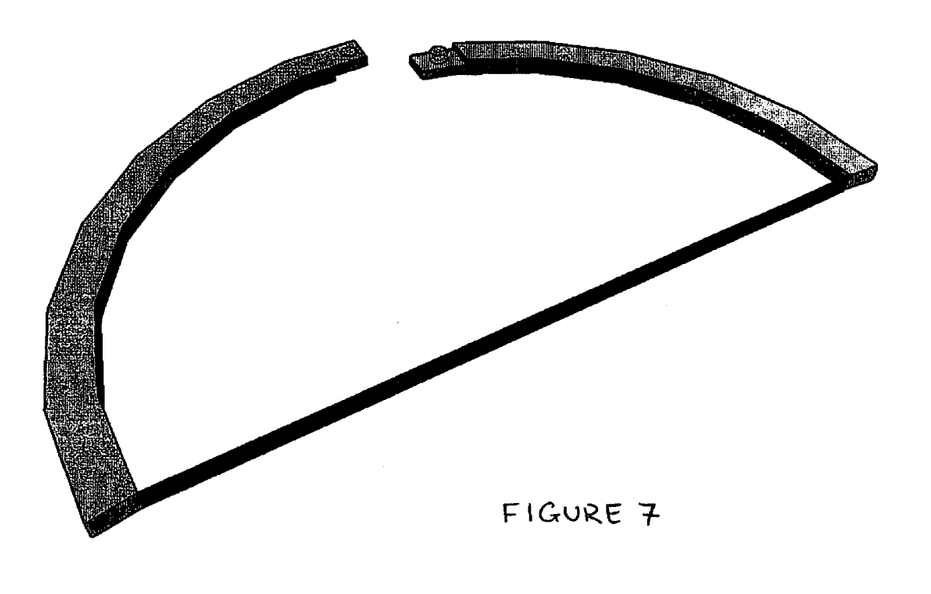
FIG. 7 shows a perspective view of a lockable D ring embedded in a shoe tag.

FIG. 7 shows a D ring which is rigid and lockable, but is still flexible enough to selectively engage and disengage and to move in relation to both the shoe, by sliding through the laces (as with other means) and through the tag itself, although it is embedded in the tag.

The present invention also relates to a pair of shoes comprising a tag as described herein.

The present invention also relates to the use of a shoe tag are described herein for aiding in the identification of left and right shoes. The present method involves attaching a tag as described herein to the shoes of an individual.

In operation, a person or caregiver flexibly attaches a left part of the tag to a left shoe and a right part of the tag to a matching right shoe. The person putting on his or her shoes places the shoes side by side and may gently bump the tag components together. In the preferred embodiment, the two tag components will click together if the right and left shoes are correctly oriented and the image or graphic will appear. If the shoes are incorrectly aligned, the tag components will not join, and the graphic will appear disjunctive.

EXAMPLES

It will be understood that the following embodiments of the present invention are intended to be illustrative of some of the possible applications or principles. Various modifications may be made by the skilled person without departing from the true spirit and scope of the invention.

Example 1

A mold is prepared having a circular shape with two square voids and a shallow channel running through it. A polypropylene plastic resin is heated until it melts and fed into the mold by an reciprocating screw injection molding machine. The mold is cooled and the plastic piece removed. The injection molding process is repeated a further three times. Two of the resultant pieces then have two NdFeB magnets positioned in the square voids. A band of fabric covered elastic is positioned in the channel. The other two pieces are positioned on top and then the parts are sealed by sonic welding. A picture of a smiling face is then applied such that half the face appears on the left part and the other half appear on the right part.

Example 2

A four year old boy has difficulty identifying his left and right shoes. The tag of Example 1 is connected to his laces by the elastic shoe-attachment means. The boy attempts to put the shoes on the wrong feet but is prompted to switch the shoes around when the two parts don't link up and he realizes that he has made a mistake. Once he switches the shoes the two parts of the tag link together with an audible click and the child sees the smiling face graphic.

The ordinarily skilled artisan can appreciate that the present invention can incorporate any number of the preferred features described above.

The above examples are included for illustrative purposes only and are not intended to limit the scope of the invention. Many variations to those described above are possible. Since modifications and variations to the examples described above will be apparent to those of skill in this art, it is intended that this invention be limited only by the scope of the appended claims.

Citation of the above publications or documents is not intended as an admission that any of the foregoing is pertinent prior art, nor does it constitute any admission as to the contents or date of these publications or documents.

I claim:

1. A shoe tag comprising a left part and a right part, each of said parts comprising:
   a shoe-attachment means that removably attaches with a corresponding shoe;
   linking means that causes the parts to releasably link to each other when the parts are placed in their correct left-right orientation; and
   wherein the parts each have applied thereon graphic art visible to an observer when the shoe-attachment means are removably attached to the corresponding shoe and the parts are placed in their correct left-right orientation and releasably linked to each other.

2. A shoe tag according to claim 1 wherein said linking means is at least one magnet.

3. A shoe tag according to claim 1 wherein said attachment means is flexible.

4. A shoe tag according to claim 1 wherein said attachment means is rigid or semi-rigid.

5. A shoe tag according to claim 2 wherein said magnet comprises at least one bar magnet.

6. A shoe tag according to claim 2 wherein said magnet comprises at least one rare earth magnet.

7. A shoe tag according to claim 1 wherein said linking means is selected from Neodymium-Iron-Boron magnets, Samarium-Cobalt magnets, or combinations thereof.

8. A shoe tag according to claim 1 wherein said shoe-attachment means is removable from at least one of the shoe and the tag.

9. A shoe tag according to claim 1 wherein said shoe-attachment means is selected from elastic, leather, fabric, hook and loop fasteners, clips, plastics, string, cords, threads, filament, twine, snaps, chain, beaded chain or combinations thereof.

10. A shoe tag according to claim 1 wherein said tag is in the shape of a circle, oval, cruciform, flower-shape, square, rectangle, sphere, or star.

11. A shoe tag according to claim 1 wherein said tag emits an audible sound when said left and right parts link together correctly.

12. A shoe tag according to claim 1 wherein said tag emits a visual signal when said parts are linked together correctly.

13. A shoe tag according to claim 1 wherein light is emitted when said left and right parts link together correctly.

14. A shoe tag according to claim 1 wherein an audible snap is emitted when said left and right parts link together correctly.

15. A shoe tag according to claim 1 wherein said tag is made out of plastics, fabrics, leather, metals, or combinations thereof.

16. A shoe tag according to claim 1 wherein said attachment means has both a locked and an unlocked position.

17. A pair of shoes comprising a left shoe, a right shoe and comprising a tag according to claim 1 wherein said left part is attached to the left shoe and said right part is attached to the right shoe.

18. Use of a shoe tag according to claim 1 for aiding in the identification of left and right shoes.

19. A shoe tag comprising a left part and a right part, each of said parts comprising:
    a band that removeably attaches with a corresponding shoe;
    magnets that releasably link said parts to each other when said parts are placed in their correct left-right orientation; and
    wherein the parts each have applied thereon graphic art visible to an observer when the band is removably attached to the corresponding shoe and the parts are placed in their correct left-right orientation and releasably linked to each other.

20. A shoe tag according to claim 19 wherein the shoe-attachment means is selected from elastic, leather, hook and loop fasteners, plastics, chain, beaded chain or combinations thereof.

21. A shoe tag according to claim 19 wherein said tag is in the shape of a circle, oval, or cruciform.

22. A shoe tag comprising a left part and a right part, each of said parts comprising:
    shoe-attachment means that removably attaches with a corresponding shoe with laces and being threaded into the laces thereof; and
    linking means that causes the parts to releasably link to each other when the parts are placed in their correct left-right orientation.

* * * * *